United States Patent

[11] 3,622,761

[72] Inventor John A. Haase
Bloomington, Minn.
[21] Appl. No. 1,112
[22] Filed Jan. 7, 1970
[45] Patented Nov. 23, 1971
[73] Assignee Control Data Corporation
Minneapolis, Minn.

[54] VARIABLE RADIX COUNTER CIRCUIT WITH AUTOMATIC RESET TO ZERO
6 Claims, 2 Drawing Figs.

[52] U.S. Cl. .................. 235/92 PE,
235/92 R, 235/92 K, 328/48, 235/92 PB
[51] Int. Cl. .................. H03k 21/36,
H03k 21/02
[50] Field of Search .................. 235/92 (4),
92 (63), 92 (64), 92 (60); 328/48

[56] References Cited
UNITED STATES PATENTS

| | | | |
|---|---|---|---|
| 2,970,763 | 2/1961 | Freeman .................. | 235/92 (63) |
| 3,112,395 | 11/1963 | Lien .................. | 235/92 (4) |
| 3,201,687 | 8/1965 | Pasquier et al. .................. | 328/48 X |

*Primary Examiner*—Daryl W. Cook
*Assistant Examiner*—Joseph M. Thesz, Jr.
*Attorneys*—Richard P. Ulrich, Thomas G. Devine, Joseph A. Genovese and Paul L. Sjoquist

ABSTRACT: A mixed radix counting device which provides automatic restoration to the zero state of the counting device upon reaching a predetermined maximum count. The counting device uses rectification means as a full-wave rectifier during counting and as a half-wave rectifier during restoration.

INVENTOR
JOHN A. HAASE

BY [signature]
ATTORNEY

INVENTOR.
JOHN A. HAASE

BY Richard P. Ulrich
ATTORNEY

VARIABLE RADIX COUNTER CIRCUIT WITH AUTOMATIC RESET TO ZERO

BACKGROUND OF THE INVENTION

This invention relates to counting devices which are capable of counting in mixed radix systems.

When counting devices are designed to count to a number which is not an integral multiple of the radix, some method must be provided to restore the counting device to the zero state. A typical example of this type of system is an ordinary digital clock. Irrespective of the way time is divided the problem of restoring the system to all zeros every 24 hours always exists. In the past, reset or restoration to the zero state has been accomplished most often with one or more relays and a capacitor, the discharge of which determines the time interval during which reset must occur. Furthermore, it is usual in the art to interrupt the connection between the power source and the load during counter advance which means that some power is dissipated irrespective of the activity of the counter. In this invention the input to the power supply is controlled thereby reducing standby power to zero.

Although any stepping relay with the proper number of contact points or steps can be used in this invention, standard commercially available electromechanical counter modules are preferred.

SUMMARY OF THE INVENTION

Although a counter counting time in minutes and seconds could be used to described this invention, a counter which counts in hours and hundredths of hours, will be used for simplicity. Since one-hundredth of an hour is 36 seconds, some device, such as a synchronous motor-driven contact, must be used to produce a pulse every 36 seconds. Since the device used to produce the pulse is not part of this invention, it will be assumed to exist.

Every 10 advance pulses will produce a carry from the one-hundredths position of the counter into the one-tenths position of the counter, while every 10 advance pulses of the one-tenths position of the counter will carry into and advance the units position cf the counter. Once of the problems which gave rise to this invention occurs in the units and tens section of the counter. Since the units position of the counter must carry into the tens position of the counter normally while counting 20 pulses, and then must restore itself to the zero state after 3 counts, some special equipment must be provided to force the counting devices to advance from 23.99 to 0000. In this invention, equipment necessary for normal counter operation also senses the fact that 23.99 hours has been reached and based on that sensed information switches into a mode wherein a plurality of pulses are supplied to the units position of the counter. The pulses continue until the units position and the tens position of the counter reach zero.

Another feature of the invention relates to the way the counter advance pulses are generated. Prior art systems merely switch a source of current into a load. In contrast to this method this device controls access to an AC source. Since AC power does not reach any part of the system, no power is dissipated until a pulse is generated.

In addition to these features, the device incorporates means for presetting the counters to any desired value, and also includes diode means for blocking signals from higher order counter positions to lower order counter positions. The invention also includes additional contact means which prevents accidental extraneous modification of a contents of the counter.

In view of the above, it is an object of this invention to provide the means for counting in a mixed radix system.

It is also an object of this invention to provide means for automatically restoring the counting system to its zero state upon reaching a predetermined maximum count.

A further object of this invention is to provide automatic restoration without the incorporation of additional relays or other special apparatus.

Another object of this invention is to control rectification means so that power is used only when the counter is advancing.

It is another object of this invention to utilize the rectification means for full-wave rectification during counting and half-wave rectification during restoration.

Other objects and advantages will become apparent upon reading the entire specification and claims in conjunction with the drawings.

DESCRIPTION OF PREFERRED EMBODIMENT

Figure 1:
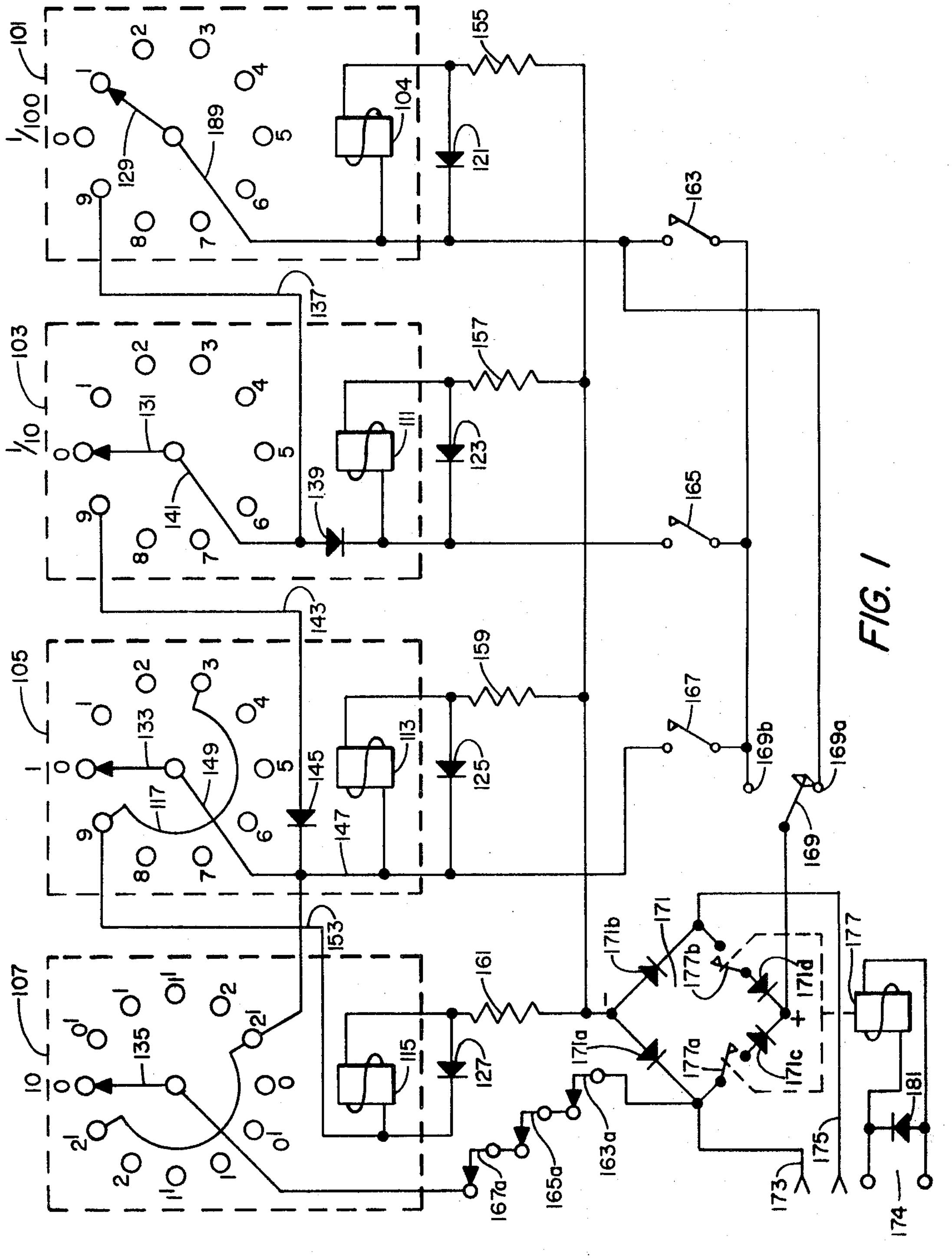
FIG. 1 is a schematic diagram of the invention.

With reference to FIG. 1, counting devices 101, 103 and 105 each have one movable contact and 10 stationary contacts. Each of the 10 stationary contacts has been designated with a number from zero through nine. The home position of each counting device is the zero position. Counting device 107 has a movable contact and 12 stationary contacts. The stationary contacts are identified in pairs. In other words, there are two successive contacts designated 0, two successive contacts designated 1, two successive contacts designated 2, etc. The dual contacts allow the units position counting device to generate an additional carry pulse each time the movable contact rests on the position marked three. In other words, the units position will carry to the tens position whenever the units position registers three, nine, 13, 19 and 23. With the dual contacts in the tens position, the additional carry does no more than advance the tens position movable contact to the next digit of the same value. Although there is no carry out of the tens position as such, there is a signal which passes through the tens position to the units position whenever the counter is in the restoration portion of its counting cycle.

In addition to the contact arrangement described above, each of the counting devices has an actuation coil associated with it. The actuation coils are numbered respectively 104, 11, 113, and 115. Contacts 3 and 9 of counting device 105 are connected with wire 117. The 2′ contacts on counting device 107 are connected with wire 119. Each of the actuation coils has a diode connected across it. The diode is connected in a manner which provides a low impedance path to the current generated when the field of the actuation coil collapses. The diodes are numbered successively 121, 123, 125 and 127. The movable contacts of each counting device are numbered successively 129, 131, 133 and 135. Each of the movable contacts rotates clockwise from one fixed point to the next in response to each pulse across its actuation coil. The carry pulse from low-order counting device 101 is applied to actuating coil 111 via wire 137 and diode 139. The junction point between wire 137 and diode 139 is also connected to the movable contact of counting device 103 by wire 141. The carry circuit from counting device 103 comprises wire 143, diode 145 and wire 147. Wire 149 connects the movable contact of counting device 105 to the junction point of wire 147 and the cathode of diode 145. Lead 151 provides the carry circuit from counting device 105 to counting device 107. Lead 153 completes a circuit from counting device 107 to actuation coil 113 of counting device 105. This lead provides a path used during the restoration portion of the cycle. Resistors 155, 157, 159 and 161, in the return paths of each of the actuating coils of each of the counting devices limit the current through the coils to a reasonable operating level. Momentary contact switches 163, 165 and 167 are the means for presetting a value in the counter. The normal carry from the units position of the counter to the tens position of the counter is used to preset the tens position value. Normally closed contact points **163*a*, 165*a*, and 167*a* block the normal restoration path whenever the presetting switches are in use. Switch 169, which is shown in its normal counting position is transferred to point 169*b*** whenever a presetting operation is to be performed. Bridge rectifier 171 comprising diodes 171*a*, 171*b*, 171*c* and 171 *d* rectifies the input AC signal received on leads 173 and 175. The normally open points 177*a*, and 177*b* of relay 177 enable the rectification process upon the receipt of an input pulse at point 179. Diode 181 limits the peak inverse voltage across relay 177 when relay 177 deenergizes. When relay points 177*a* and 177*b* are open, no output is obtained from rectifier 171. Upon receipt of an input pulse at point 179, relay 177 is energized and closes points 177*a* and 177*b*. Upon closure of these points, the AC signal received over lines 173 and 175 is full-wave rectified by rectifier 171 and produces a DC signal of the indicated polarity. This DC signal remains in existence until relay 177 is deenergized. Assuming an operation in which no carry takes place, the path of the DC signal is through switch 169, through actuation coil 104, and through resistor 155 to the anodes of diodes 171*a* and 171*b*. When coil 104 is energized, the movable contact of counting device 101 is conditioned to move. Actual movement of the contact does not occur until the counting pulse disappears. This operation continues until the movable contact of counting device 101 is resting upon the contract marked 9. Upon receipt of the next counting pulse after the movable contact reaches 9 not only is counting device 101 conditioned to advance, but so is counting device 103. Upon disappearance of that particular pulse, the movable contacts of both counting device 101 and counting device 103 advance. To described the path in detail, the counting pulse energizes the actuating relay of counting device 101 in its normal manner and simultaneously travels through lead 189, movable contact 129, lead 137, diode 139 and energizes actuating coil 111.

The operation of the carry from counting device 103 to counting device 105 is identical with the operation just described. The operation of the carry from counting device 105 to counting device 107 is different from that previously described only because fixed point 3 and fixed point 9 are joined by lead 117. The existence of this jumper means that a carry from counting device 105 will occur each time the movable contact rests on fixed contact 3 in addition to the normal carry which would occur when movable contact rests on fixed contact 9. The jumper is used to handle the special situation which exists when the counter registers 23.99 hours and must carry to the all zero position. However, because the jumper does exist, counting device 107 requires a pair of fixed contacts at each position. By having a pair of fixed contacts, the additional carry generated by counting device 105 has no deleterious effect on the counting of the system. All that happens is that counting device 107 advances from the first of the pair of contacts to the second of the pair of contact, for example, from 0 to 0′.

Another inventive feature of the device is shown when the counter registers 23.99 hours. If the counter registers 23.99 hours, and a counting pulse has been received, all the counting devices has been prepared or conditioned to advance. Counting device 101 and 103 advance to their respective zero fixed contacts, counting device 105 advances to its fixed contact 4, and counting device 107 advances to fixed contact 2′. Upon the occurrence of this advance, automatic restoration begins. Relay points 177*a* and 177*b* are open, while points 163*a*, 165*a* and 167*a* are closed. A circuit path is established from line 173 through points 163*a*, 165*a* and 167*a*, through movable contact 135, through fixed contact 2′, through lead 153, through actuating coil 113, through resistor 159 to common buss 187, through diode 171*b* and through lead 175. Since diode 171*b* is only half-wave rectification means, the pulse to energize actuating coil 113 will be available only every other half-cycle. Each time coil 113 is energized, movable contact 133 will advance until the movable contact rests on fixed contact 9. At that time the next pulse will energize not only actuating coil 113, but also actuating coil 115. Actuation of both of these coils conditions the movable contacts of each of the counting devices to advance to the restored positions or position zero thereby restoring the entire counter to its all zero state.

Normally closed points 163*a*, 165*a* and 167*a* are actuated when switches 163, 165 or 167 are closed. Inclusion of these points in the circuit which is used during restoration, prevents the existence of a short circuit whenever switches 163, 165 or 167 are being used to preset the value of the counter. Protection against accidentally changing the value contained in the counter is provided by a requirement that switch 169 be set with its movable point resting on fixed point 169*b* before the closing of switches 163, 165 or 167 will have any effect. Diodes 145 and 139 prevent preset pulses from higher order counter positions from affecting lower order counting positions. For example, closing switch 167 will not change the value of the setting of counting device 103 even though the movable contact of counting device 103 may happen to rest on fixed contact 9 because of diode 145. This same protection is afforded by diode 139.

Figure 2:
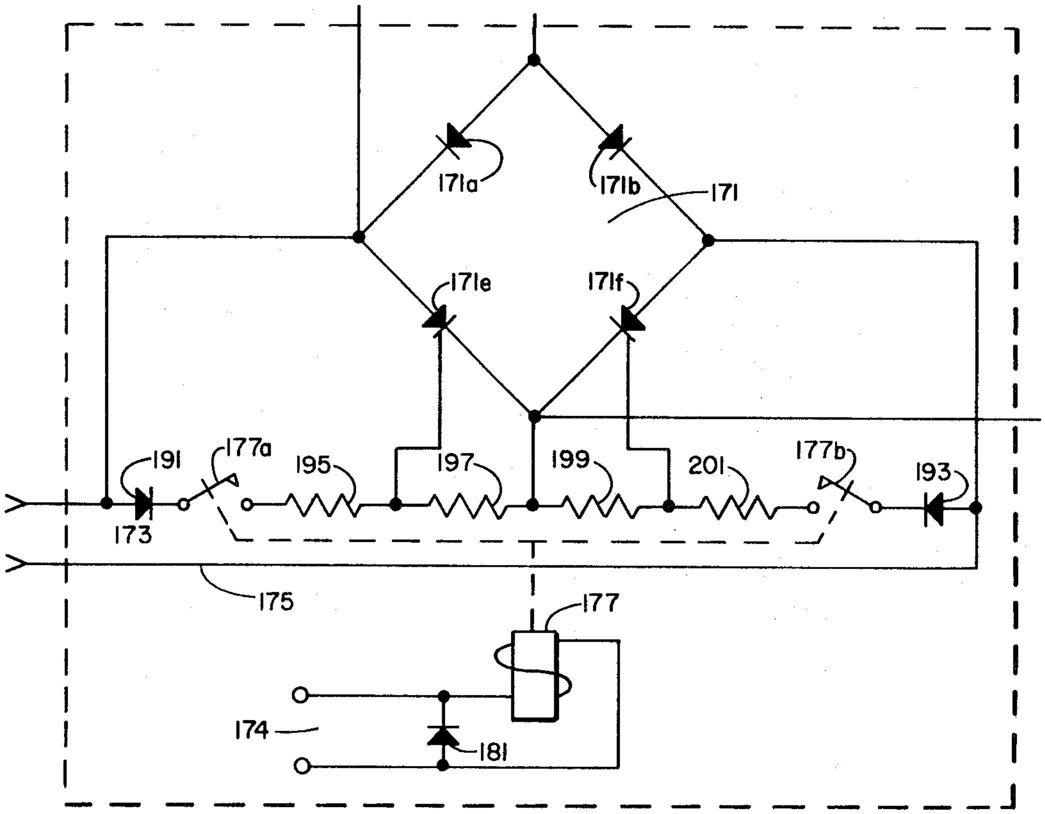
FIG. 2 shows an alternative method of applying input pulses to the full-wave rectifier.

The rectification means shown in FIG. 2 differs from that shown in FIG. 1 in that diode means 171*c* and 171*d* have been replaced by silicon controlled rectifiers 171*e* and 172*f*. In addition, relay points 177*a* and 177*b* have been removed from the bridge and placed in the circuitry developing the signal to the control electrodes of the SCR's. Diode 191 and 193 rectify the AC to be applied to the control electrodes of the SCR's upon closure of relay 177. Resistors 195 and 197 comprise a voltage divider and provide the correct signal level at the control electrode on SCR 171*e*. Resistors 199 and 201 comprise another voltage divider which generates the proper signal to be supplied to the control electrode of SCR 171*f*.

Upon energization of relay 177, relay points 177*a* and 177*b* close, thereby providing a path through diode 191, resistor 195 and resistor 197 and another path through diode 193, resistor 201 and resistor 199. The signal through the path including diode 191 enables SCR 171*e*, and the signal through the path including diode 193 enables SCR 171*f*. Since all four legs of bridge rectifier 171 are able to conduct, the bridge provides the counting pulse as before. The rest of the circuit operates as described in connection with FIG. 1.

As stated earlier, neither the description of the device as one using counting modules nor the description of the device as a clock in which 24 hours is divided into hours and hundredths of hours is intended as limitation.

I claim:

1. A counter comprising:

a. A plurality of counting devices having a plurality of fixed contact points, the number of fixed contact points and their interconnection varying according to the radix of the counting devices, each counting device having a movable contact which advances sequentially from fixed point to fixed point in response to an electrical pulse, the counting devices being interconnected so that the lower order devices carry into the higher order devices, the highest order device receiving and distributing pulses from an input source during the restoration of the counter from a predetermined maximum setting to a zero state; and b. rectification means connected to the counting devices for supplying full-wave rectified energizing current to the counting devices for counting in response to an input pulse, and supplying half-wave rectified current to the counting devices during restoration of the counter to provide restoration pulses.

2. The counter claimed in claim 1 wherein the rectification means is a bridge rectifier having first switching means connected in at least two of its legs, the first switching means enabling operation of the rectificaton means as a full-wave rectifier when the switching means is closed.

3. The counter as claimed in claim 2 wherein the first switching means are relay points.

4. The counter claimed in claim 2 wherein the first switching means are silicon controlled rectifiers.

5. The counter claimed in claim 4 further comprising:

aa. additional switching means for actuating the first switching means;

bb. a pair of diodes; and cc. a plurality of resistors connected to form a pair of voltage dividers, each voltage divider being serially connected with a diode and a part of the additional switching means, each serial combination providing a unit directional control signal to a silicon controlled rectifier whereby the first switching means is enabled in response to actuation of the additional switching means.

6. A counter comprising:

a. A plurality of counting devices having a plurality of fixed contact points, the number of fixed contact points and their interconnection varying according to the radix of the counting devices, each counting device having a movable contact which advances sequentially from fixed point to fixed point in response to an electrical pulse, the counting devices being interconnected so that the lower order devices carry into the higher order devices, the highest order device receiving and distribution pulses from an input source during the restoration of the counter from a predetermined maximum setting to a zero state;

b. rectification means connected to the counting devices, for energizing the counting devices during counting the rectification means being enabled in response to an input pulse, and providing restoration pulses during restoration of the counter; and c. means for presetting the counter to a predetermined value, including additional contact means connected in the path of the restoration pulses for blocking the restoration pulses during presetting.

* * * * *